May 8, 1962

J. R. PALMER 3,032,769

METHOD OF MAKING A BRACKET

Filed Aug. 18, 1959

INVENTOR.
JOHN R. PALMER
BY
Wheeler, Wheeler & Wheeler
ATTORNEYS

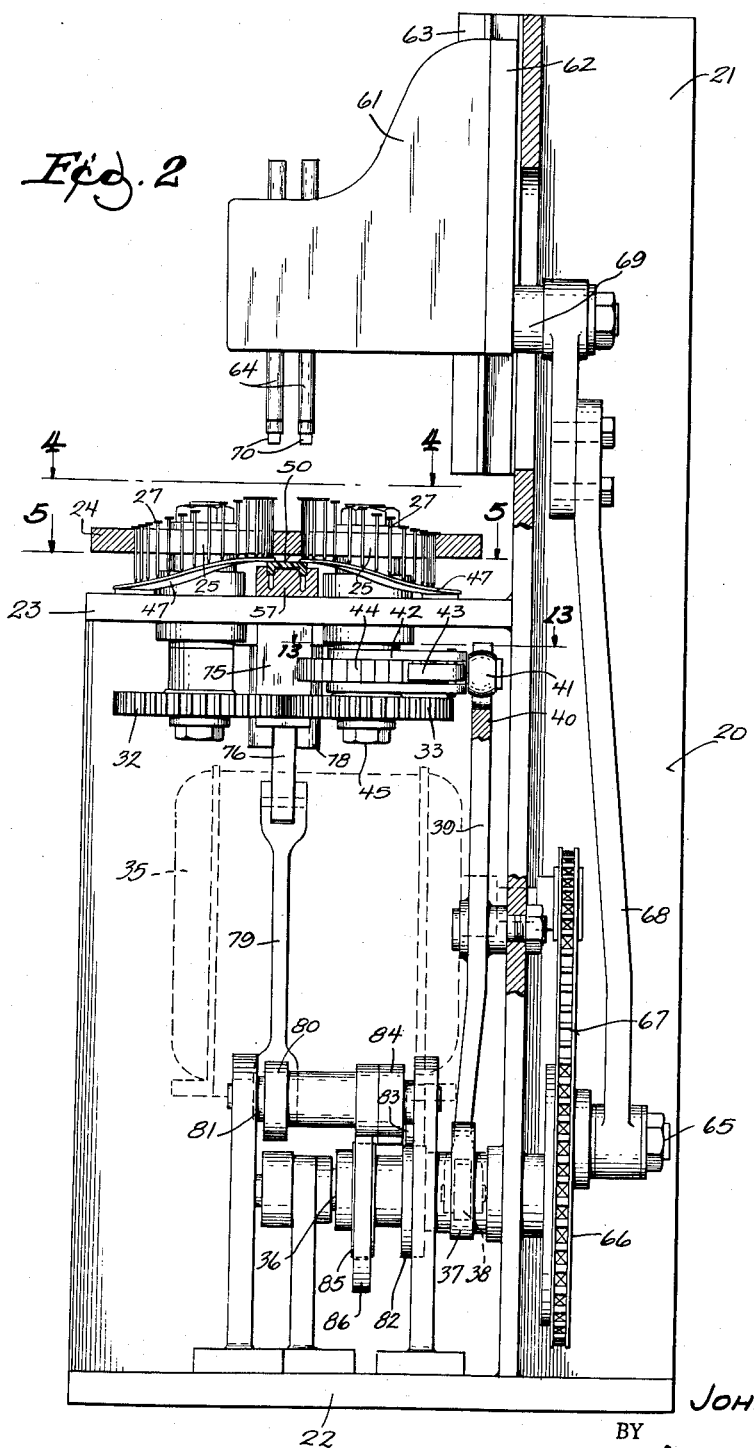

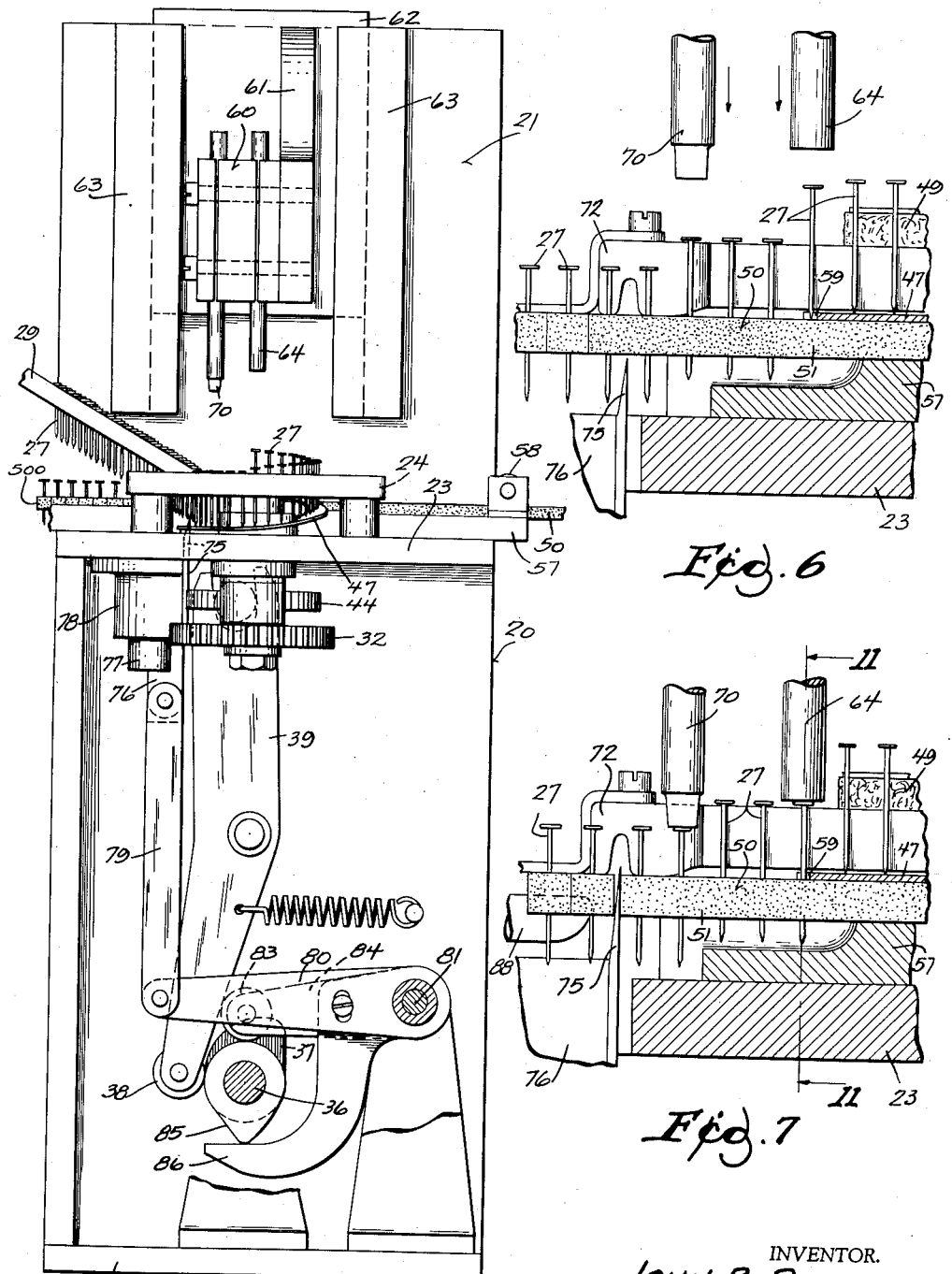

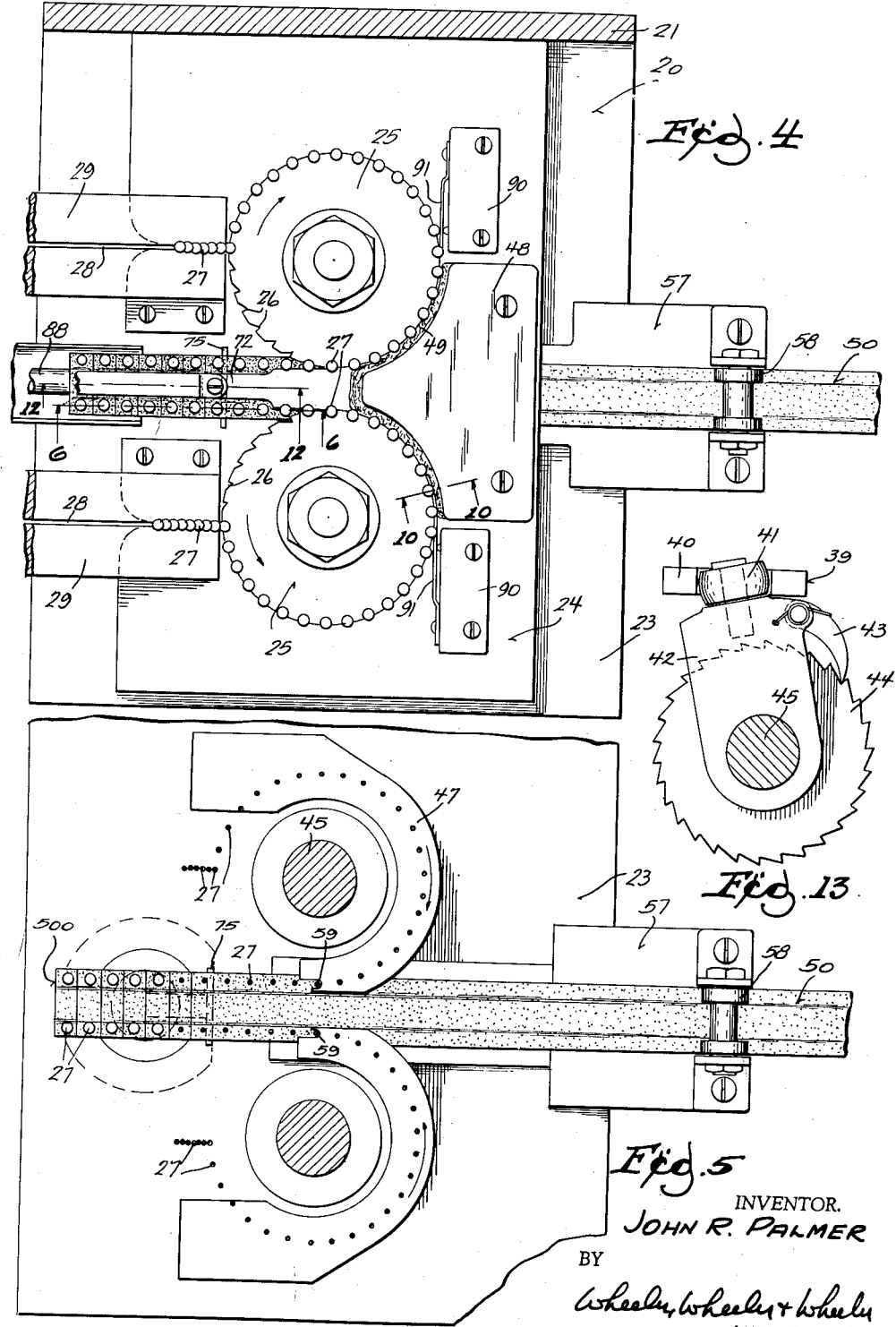

May 8, 1962 J. R. PALMER 3,032,769
METHOD OF MAKING A BRACKET
Filed Aug. 18, 1959 5 Sheets-Sheet 5
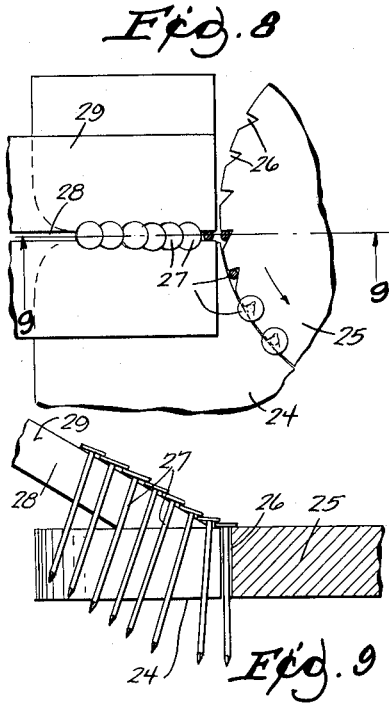
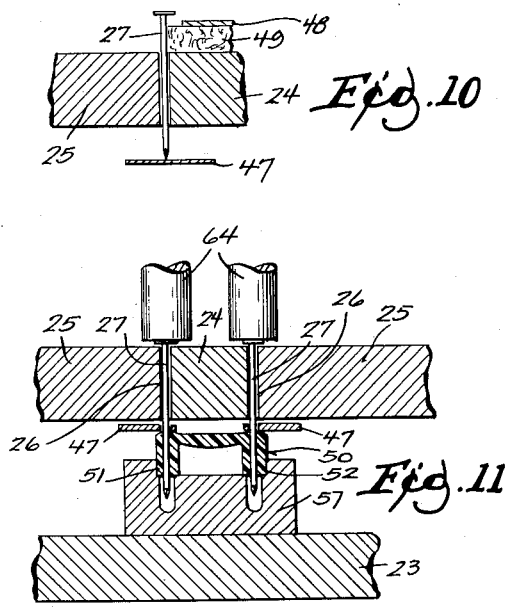
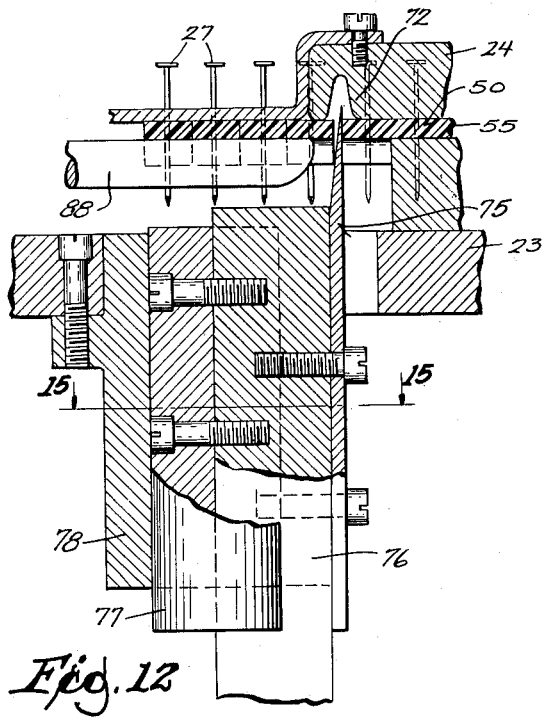
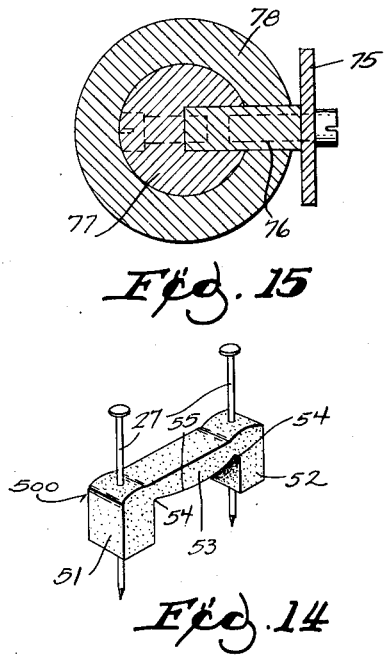
INVENTOR.
JOHN R. PALMER
BY
Wheeler, Wheeler & Wheeler
ATTORNEYS

United States Patent Office 3,032,769
Patented May 8, 1962

3,032,769
METHOD OF MAKING A BRACKET
John R. Palmer, 909 Memory Lane, West De Pere, Wis.
Filed Aug. 18, 1959, Ser. No. 834,450
3 Claims. (Cl. 1—66)

This invention relates to a flexible bracket used like a staple for securing wiring or pipes or the like and a method for the production of such brackets.

The bracket is made of synthetic resin such as polyethylene to comprise a pair of terminal blocks connected by an integral web of non-uniform cross section having minimum thickness adjacent the blocks and being downwardly convex intermediate the blocks. There are fastening nails driven partially through the respective blocks to be unitarily frictionally held therein. In use, the nails anchor the blocks to a supporting surface, with the intermediate web spanning pipes or wiring or tubing to be positioned thereby.

The method involved in the production of such brackets includes feeding a continuous extruded strip of the desired cross section beneath a pair of rotors which feed the nails into position above those portions of the extruded strip which are to provide the lateral blocks. As the strip and the nails are advanced, step by step, drivers are operated during periods of dwell to force the nails into the blocks. In the next successive periods of advance, the nails and the strips are moved forwardly to a cutoff station where transverse sections of the strip are transversely sheared from the leading end of the strip, each such section comprising terminal blocks with nails positioned therein to constitute a finished bracket.

Any conventional nail feeders may be used for delivery of successive nails from a hopper through appropriate guides to respective rotors whose notched peripheries carry one nail at a time from the end of each guide as the rotors are advanced in steps by a ratchet mechanism. In the continued advance of the rotors, the nails are lifted clear of the edges of the extruded plastic strip into which the nails are to be driven. The peripheries of the rotors move over the edges of such a strip and during intervals of dwell between successive advances of the rotors drivers force the nails into the strip, preferably in two successive operations. In the first driving operation the nail points penetrate into the plastic strip sufficiently to secure each successive nail to the strip but without maximum projection therethrough. In the successive driving operation, the nail is driven to its maximum projection from its opposite face, the support being relieved to accommodate the nail point.

A feature of the invention consists in using the driving engagement of the notched peripheral portions of the rotors with the respective nails as a means of effecting the step-by-step advance of the strip into which the nails are driven.

During intervals of dwell in the strip advance, a shear blade is reciprocated through the strip to sever a transverse terminal portion thereof which contains two of the aforesaid blocks with nails projecting therefrom, the same constituting a flexible bracket.

In the drawings:

FIG. 2 is a view partially in elevation and partially in section showing the device of FIG. 1.

FIG. 3 is a view in side elevation of the device shown in FIG. 1.

FIG. 4 is a view in horizontal section taken on the line 4—4 of FIG. 2.

FIG. 5 is a view in horizontal section taken on the line 5—5 of FIG. 2.

FIG. 6 is an enlarged detail view taken in section on the line 6—6 of FIG. 4.

FIG. 7 is a view similar to FIG. 6 showing the parts in different relative positions.

FIG. 8 is an enlarged fragmentary detail view of a portion of the structure shown in FIG. 4.

FIG. 9 is a view taken in section on the line 9—9 of FIG. 8.

FIG. 10 is a view taken in section on the line 10—10 of FIG. 4.

FIG. 11 is a view taken in section on the line 11—11 of FIG. 7.

FIG. 12 is an enlarged detail view taken in section on the line 12—12 of FIG. 4.

FIG. 13 is a detail view taken in section on the line 13—13 of FIG. 2.

FIG. 14 is a view in perspective showing a finished staple made in accordance with the invention.

FIG. 15 is a view taken in section on the line 15—15 of FIG. 12.

Figure 1:
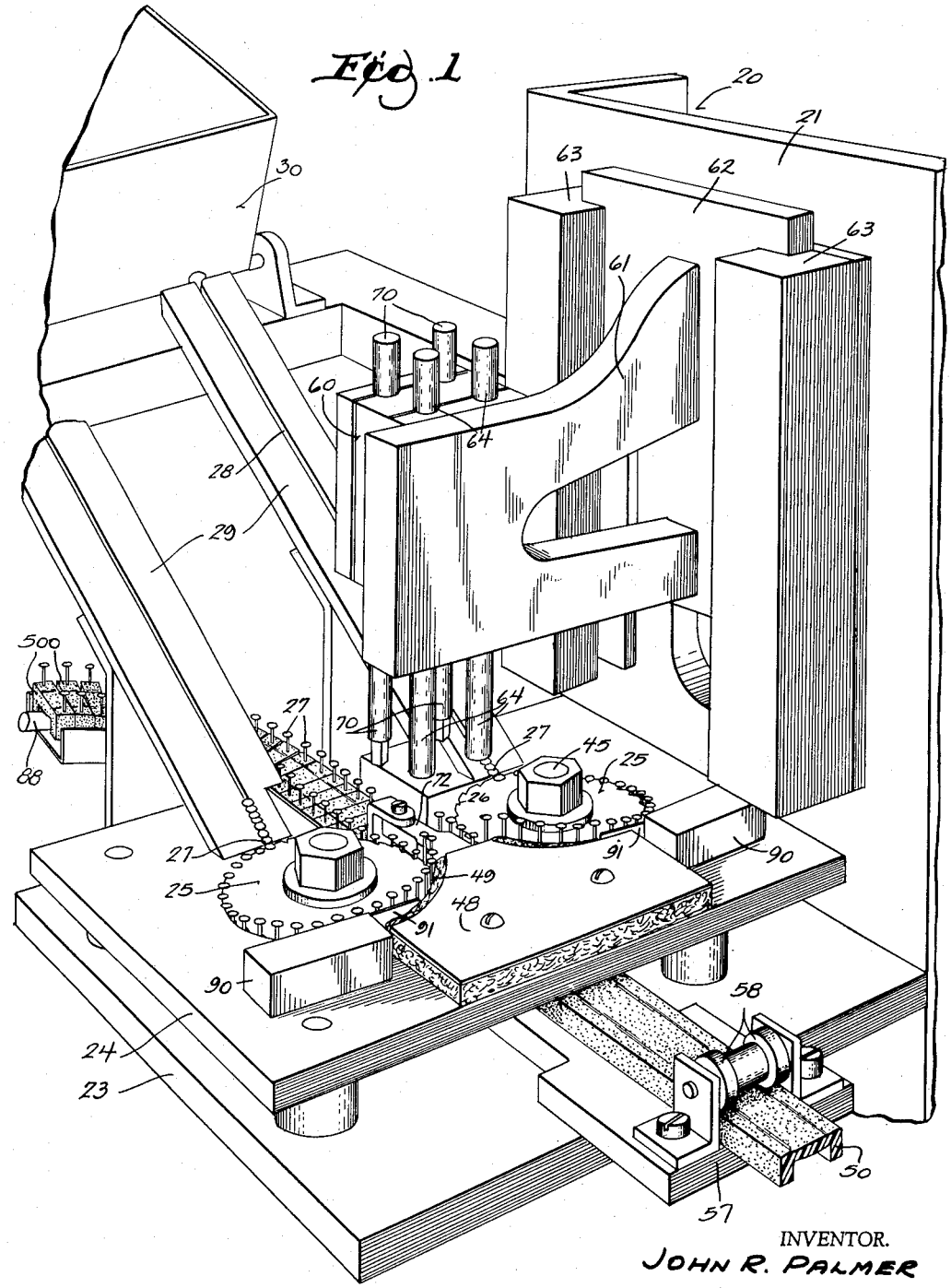
FIG. 1 is a fragmentary detail view in perspective showing portions of a device embodying the machine invention and designed to facilitate the practice of the method invention.

The machine frame 20 comprises a column 21 on base 22 to support the table 23 on which a sub-table 24 is mounted. In the plane of the sub-table 24 are the rotors 25. Each is provided with peripheral notches 26 to receive the nails 27 successively from the feed slot 28 of delivery chute 29 to which the nails are fed from the hopper 30 in the conventional manner. The rotors 25 turn in opposite directions. The nails engaged in their peripheral notches are confined therein by the margins of the sub-table 24 which surround the rotors. The respective rotors are mounted on shafts which are interconnected by gears 32, 33 (FIG. 2) whereby both will receive motion from the driving mechanism now to be described.

A motor 35 has a chain and sprocket driving connection to cam shaft 36 (FIGS. 2 and 3). The cam 37 on shaft 36 coacts with the laterally adjacent cam follower roller 38 at the lower end of lever 39. When the cam 37 displaces the lever 39, the upper end portion 40 of such lever acts on the spherical roller 41 at the end of the pawl lever 42 to oscillate lever 42. The pawl 43 pivotally mounted on lever 42 as shown in FIG. 13 interacts with the ratchet wheel 44 on the shaft 45 of one of the rotors 25 for the step-by-step rotative advance of both of the inter-geared rotors.

As the rotors advance, the successive nails 27 engaged by their peripheral notches ride up onto fixed cams 47 as best shown in FIG. 2 and FIG. 3, the object being to raise their points sufficiently to clear the infeed of the extruded plastic strip to be penetrated. A plate 48 (FIG. 4) carries a deformable border strip 49 of felt or other yieldable material which engages the nails as the nails are lifted by the cams and supports the nails as they move over the extruded strip 50.

The strip 50 is made of extruded flexible polyethylene or other suitable plastic to have the desired cross section of bracket which is to be produced. It comprises relatively heavy lateral portions 51 and 52 which constitute blocks or legs of the finished bracket in which the nails 27 are driven. The block portions 51 and 52 are connected by an intermediate web 53 which is of minimum thickness at 54 where it joins the block portions 51 and 52 and is of maximum thickness in its central portion 55. It is found that this particular contour is well adapted to distribute pressure of the bracket to all portions of the wire or wires or conduit or tubing anchored by the bracket when the latter is in use. While other contours are possible in the practice of the method, the method is particularly appropriate for production of this unusual contour which is different from anything which could be made of stamped metal, for example.

As best shown in FIGS. 1 and 2, a channeled guide member 57 is complementary to the cross section of the extruded strip 50 and the strip may be maintained interlocked with its guide by means of a confining roller 58 which is best shown in FIG. 1. The respective cams 47 extend over the leg portions 51 and 52 of the extruded strip 50 as clearly appears in FIG. 2 so that the nails 27 are above the leg portions 51, 52 when they reach the notches 59 in the ends of the respective cams as shown in FIG. 6.

When a given nail 27 is advanced to register with the notch 59 at the end of the interlocking cam, it is also released by the padding strip of felt or the like 49, whereby the nail will drop into the notch 59 as clearly shown in FIG. 6. Immediately thereafter there is a period of dwell in the advance of the respective rotors 25 as effected by the ratchet and pawl mechanism above described.

The driving head 60 is carried on arm 61 of slide 62 which is reciprocable vertically in ways 63 mounted on the column 21. There are four drivers arranged in two pairs. The drivers 64 are laterally adjacent each other and directly above the notches 59 in the head of the cams 47. When the driving head 60 descends, the drivers 64 engage the heads of the nails 27 which register therewith, forcing a pair of nails into the block portions 51 and 52, respectively, at opposite sides of the extruded strip 50. When the ratchet and pawl mechanism brings about the next rotative advance of the rotors 25, the peripherally notched portion of these rotors will still be engaged with the nails 27 just driven by the drivers 64. Motion will be transmitted through these nails to extruded strip 50, this being the only means of advance of such strip. The driving head will, of course, be retracted before this advance of the extruded strip is made to occur.

The means for raising and lowering the slide 62 to bring about the movement of the driving head 60 includes a crank 65 on the driven sprocket 66 which receives motion through the chain 67 of the motor 35. A connecting rod 68 is engaged with crank 65 and also engaged with a pin 69 on slide 62 for the vertical reciprocation of the slide above described.

Also carried by the slide is a second pair of laterally adjacent drivers as shown at 70. These are located to register with a pair of nails which are three stations in advance of those acted on by the drivers 64. The drivers 70 extend to a somewhat lower level than the drivers 64, as clearly appears in FIGS. 6 and 7. Thus, when the drivers 64 are causing a pair of nails 27 to make their first penetration into the lateral block portions of the extruded strip 50, the drivers 70 will be effecting a further advance of a pair of nails which have previously penetrated the extruded strip. In this further advance, the nails will reach their final positions with respect to the strip.

At the second station beyond the point at which the drivers 70 impel a pair of nails 27 to their final positions, the strip 50 will be sheared by the vertically reciprocable knife 75 to produce the finished product shown in FIG. 14. A thrust-receiving member 72 overlies the web portion 55 of the extruded strip 50 to hold the strip against upward yielding movement when it is engaged by the web 55 which shears the bracket therefrom. The knife 75 is mounted on the edge of a strip 76 set into a reciprocable bar 77 guided in a split tube bearing 78 as best shown in FIGS. 9 and 15. The link 79 connects the knife mounting strip 76 with a rocker arm 80 which is pivotally mounted on a rock shaft 81. The cam shaft 36 carries a raising cam 82 (FIG. 2) which coacts with a roller 83 on the arm 84 of rock shaft 81. The cam shaft carries a lowering cam 85 which coacts with an arm 86 of rock shaft 81. The positive raising and lowering insures against sticking of the cut-off knife in its movement with respect to the extruded plastic strip 50. With each upward movement of the knife 75 a finished bracket is severed from the strip 50. In the continued advance of the strip, the successive brackets are pushed from the apparatus on the guide way 88 as indicated at 500 in FIG. 1. Any desired means may be provided for the automatic counting or packaging. Optionally, limit switches 90 may have arms 91 acted on by nails 27 to close the motor circuit only while nails are available.

While the operation of the mechanism provided for the convenient manufacture of brackets according to the present invention will be apparent from the foregoing description of its parts and their relationships, it will also be evident the most of the operations above described may be performed by hand. Given an extruded strip of flexible synthetic resin of the desired cross sectional contour, nails may be forced or driven in opposed pairs into the marginal block portions of the strip. By pressure on the nails already driven, the strip may be advanced to a position for receiving another pair of nails. After a succession of pairs of nails have been forced or driven into the sides of the continuous plastic strip, successive transverse sections can be severed from the strip intermediate successive nail pairs to make completed brackets.

It is desirable that the operation of driving or forcing the nails into the strip take place in two successive stages. In the first place, it is desired to start the nails while the strip is supported from beneath in a way which would not be convenient if the nails were to be driven full depth in the first stage. In the second place, the synthetic resin opposes considerable friction to the movement of the nails and an intervening dwell after the initial setting of the nails allows the strip to resume its original form before the nails are driven to their final positions. The advance of the extruded plastic strip by means of the thrust of the rotors on the nails driven therein is not only convenient but eliminates the provision of any separate means of strip feed. As will be noted, the method and the apparatus are both simple and they produce an unusual type of bracket in high volume and at low expense.

I claim:

1. A method of bracket manufacture which comprises the steps of driving nails in pairs into an elongated flexible strip of channel-shaped cross section with a central web and spaced flanges, the nails being driven into the flanges at opposite sides of the web and having points projecting from the flanges, and transversely severing from each other respective portions of the strip in which the nails have previously been driven, each portion so severed constituting a bracket.

2. The method of claim 1 in which the severing operation includes shearing the strip upwardly and supporting it from above against the upward pressure of the shear.

3. The method recited in claim 1 which includes driving said nails into the strip in two successive stages with an intervening dwell.

References Cited in the file of this patent
UNITED STATES PATENTS

| | | |
|---|---|---|
| 1,529,881 | Engle | Mar. 17, 1925 |
| 1,793,960 | Probert et al. | Feb. 24, 1931 |
| 1,942,249 | Kleinschmit | Jan. 2, 1934 |
| 2,103,176 | Randall | Dec. 21, 1937 |
| 2,223,241 | Ryan | Nov. 16, 1940 |
| 2,231,178 | Beckwith | Feb. 11, 1941 |
| 2,418,539 | Anderson | Apr. 8, 1947 |
| 2,522,656 | Whalen | Sept. 19, 1950 |
| 2,623,209 | Unwin | Dec. 30, 1952 |
| 2,681,196 | Lind | June 15, 1954 |
| 2,752,597 | Kent | July 2, 1956 |